US010438790B2

(12) United States Patent
Lipson et al.

(10) Patent No.: US 10,438,790 B2
(45) Date of Patent: Oct. 8, 2019

(54) EFFICIENT MID-INFRARED SOURCES

(71) Applicant: The Trustees of Columbia University in the City of New York, New York, NY (US)

(72) Inventors: Michal Lipson, New York, NY (US); Gaurang R Bhatt, Ontario (CA); Raphael St-Gelais, New York, NY (US); Avik Dutt, Stanford, CA (US); Steven Miller, New York, NY (US); Felippe A. S. Barbosa, São Paulo (BR)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 15/971,283

(22) Filed: May 4, 2018

(65) Prior Publication Data

US 2018/0323054 A1    Nov. 8, 2018

Related U.S. Application Data

(60) Provisional application No. 62/501,460, filed on May 4, 2017.

(51) Int. Cl.
*H01K 7/00* (2006.01)
*H01K 1/14* (2006.01)
*H01K 1/32* (2006.01)
*G01J 3/26* (2006.01)

(52) U.S. Cl.
CPC ............... *H01K 7/00* (2013.01); *G01J 3/26* (2013.01); *H01K 1/14* (2013.01); *H01K 1/325* (2013.01)

(58) Field of Classification Search
CPC .. H01K 7/00; H01K 1/14; H01K 1/325; G01J 3/26
USPC ................. 250/493.1, 494.1, 504 R
See application file for complete search history.

(56) References Cited

U.S. PATENT DOCUMENTS

| 2011/0023941 | A1* | 2/2011 | DiDomenico | ...... H01L 31/0352 136/246 |
| 2017/0139238 | A1* | 5/2017 | Abouraddy | ............... G02F 1/21 |
| 2017/0222389 | A1* | 8/2017 | Chen | ..................... H01S 3/0323 |

OTHER PUBLICATIONS

Cornelius et al., "Modification of Planck blackbody radiation by photonic band-gap structures", Phys. Rev. A., 1999, 59, 4736, 37 pages.
Hodgkinson et al., "Non-dispersive infra-red (NDIR) measurement of carbon dioxide at 4.2 μm in a compact and optically efficient sensor", Sens. Actuators B Chem., 2013, 186, 580-588.
Ideguchi et al., "Adaptive real-time dual-comb spectroscopy", Nat. Commun., 2014, 5, 3375, 8 pages.
Karpf et al., "Real-time trace gas sensor using a multimode diode laser and multiple-line integrated cavity enhanced absorption spectroscopy", Appl. Opt., 2015, 54, 6085-6092.
Liu et al., "Development of Low Power Consumption DFB Quantum Cascade Lasers", IEEE Photonics Technol. Lett., 2015, 27, 2335-2338.

(Continued)

*Primary Examiner* — Nicole M Ippolito
(74) *Attorney, Agent, or Firm* — BakerHostetler

(57) ABSTRACT

A emitter is formed of a thin-film membrane disposed within a cavity so as to provide a output beam. The emitter may be configured to obtain broadband light. The emitter may enhance the emissivity of light over a broad spectral band.

20 Claims, 4 Drawing Sheets

(56) References Cited

OTHER PUBLICATIONS

Lourenço et al., "Breath Analysis in Disease Diagnosis: Methodological Considerations and Applications", Metabolites, 2014, 4, 465-498.
Roller et al., "Nitric oxide breath testing by tunable-diode laser absorption spectroscopy: application in monitoring respiratory inflammation", Appl. Opt., 2002, 41, 6018-6029.
St-Gelais et al., "Near-field radiative heat transfer between parallel structures in the deep subwavelength regime", Nat. Nanotechnol., 2016, 11, 515-519.
Williams et al., "Terahertz quantum-cascade lasers", Nat. Photonics., 2007, 1, 517-525.
Wysocki et al., "Spectroscopic trace-gas sensor with rapidly scanned wavelengths of a pulsed quantum cascade laser for in situ NO monitoring of industrial exhaust systems", Appl. Phys. B., 2005, 80, 617-625.

\* cited by examiner

EFFICIENT MID-INFRARED SOURCES

CROSS-REFERENCE TO RELATED APPLICATIONS

This application claims priority to U.S. Provisional Patent Application No. 62/501,460, filed May 4, 2017, the contents of which is incorporated herein by reference in its entirety.

TECHNICAL FIELD

A method is described for obtaining efficient, broadband collimated thermal light sources with extremely high optical output with minimal electrical input power for use in applications such as molecular spectroscopy, gas sensing, environmental monitoring, health monitoring, and the Internet of Things.

BACKGROUND

Conventional sources for generating mid-infrared light include quantum cascade lasers, frequency comb sources, and conventional incandescent sources. However, each of these sources has significant limitations. For example, quantum cascade lasers require high power consumption and only provide a limited bandwidth. See, for example, Y. Liu, J. et al., Development of Low Power Consumption DFB Quantum Cascade Lasers, IEEE Photonics Technol. Lett. 27 (2015) 2335-2338; G. Wysocki, et al., Spectroscopic trace-gas sensor with rapidly scanned wavelengths of a pulsed quantum cascade laser for in situ NO monitoring of industrial exhaust systems, Appl. Phys. B. 80 (2005) 617-625; and B. S. Williams, et al., Terahertz quantum-cascade lasers, Nat. Photonics. 1 (2007) 517-525. Frequency comb sources similarly require high power consumption and require non-linear materials. See, for example, T. Ideguchi, et al., Adaptive real-time dual-comb spectroscopy, Nat. Commun. 5 (2014) 3375. On the other hand, conventional incandescent sources of the type used in incandescent lamps provide inefficient, isotropic emission. See, for example, J. Hodgkinson, et al., Non-dispersive infra-red (NDIR) measurement of carbon dioxide at 4.2 µm in a compact and optically efficient sensor, Sens. Actuators B Chem. 186 (2013) 580-588.

Thermal sources (or black bodies) cans serve as mid-IR emitters; however, these sources are low efficiency and emit in all directions.

Improved mid-infrared sources are desired that provide a high optical output with a minimal input electrical power and that address the limitations of the conventional mid-infrared light sources. The invention described herein addresses these needs in the art.

SUMMARY

A thermal emitter is formed of a thin-film silicon carbide or silicon nitride thermal membrane or any other suspended thermal emitter film disposed within a cavity so as to provide a thermal output beam with a high degree of collimation. The cavity is configured such that thermal transmission through the cavity substantially matches a thermal absorption of the thin-film (e.g., within a difference such that the output is enhanced above fundamental emission). As an example, a level of enhanced power output of the broadband output beam is inversely proportionally to a difference between the transmissivity through the cavity and the absorption of the thin-film membrane. The thickness of the thin-film thermal membrane may be selected whereby a thermal absorption of the thin-film matches the thermal transmission of the cavity. A cavity back mirror may also be provided wherein a loss of the cavity back mirror matches the thermal transmission of the cavity. The cavity back mirror may comprise, for example, a broadband (e.g., concave) mirror. However, other mirrors may be used. The thin-film membrane and the broadband concave mirror may be optically aligned to form a Fabry-Perot cavity.

A partially reflecting mirror may be disposed in front (optically) of the thin-film, wherein the thin-film thermal membrane is disposed in the optical cavity between the cavity back mirror and the partially reflecting mirror. The partially reflecting mirror may be selected whereby the thermal transmission through the cavity matches an absorption of the thin-film thermal membrane.

The thin-film membrane may be disposed between two mirrors. The transmissivity through the cavity may match or substantially match an absorption of the thin-film membrane.

In the example, where the thin film is silicon carbide, the thermal emitter is formed by depositing a silicon carbide thin-film on a silicon wafer using a plasma enhanced chemical vapor deposition (PECVD) technique using a mixture of silane and methane in a ratio of approximately 1:20 as precursors with argon as a dilution gas, annealing the deposited thin-film at a temperature of approximately 600° C. for approximately 90 min to obtain microcrystalline silicon carbide (µC—SiC), and forming a membrane with concentrically placed integrated platinum heaters by etching the silicon wafer from a back side using a combination of bosch (SF6) and isotropic etching techniques and depositing a thin film of SiO2 between the silicon carbide thin-film and platinum heaters. The silicon carbide may be replaced by silicon nitride of any other suitable film fabricated in other ways in alternative embodiments.

BRIEF DESCRIPTION OF THE DRAWINGS

The above and other objects and advantages of the invention will be apparent to those skilled in the art based on the following detailed description in conjunction with the appended figures, of which.

DETAILED DESCRIPTION

An exemplary embodiment of a method and device for obtaining broadband thermal light is described below with respect to FIGS. 1-4. Although various configurations are shown and discussed, such configurations are not limiting. Alternative configurations may be used to define a cavity using the thin-film membrane as a boundary or by placing the thin-film membrane between optical components within a cavity. Various configurations may be used such that transmissivity through the cavity may match or substantially match an absorption of the thin-film membrane. Those skilled in the art will appreciate that the steps described are for exemplary purposes only and are not limited to the specific process described.

Figure 1:
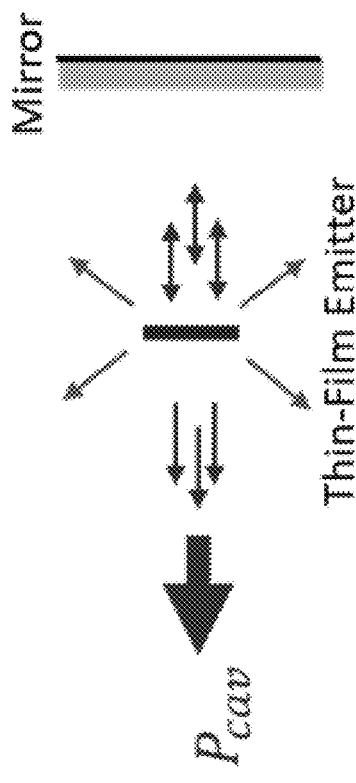
FIG. 1 illustrates thermal emitter including a hot thin-film and a back reflecting mirror in an exemplary embodiment in accordance with the invention.

A thin-film membrane (e.g., emitter) may be disposed inside an optical cavity, which may include defining a boundary of the optical cavity. The thin-film may be semi-transparent and may require little power to heat. However, the thin-film material could be any thin-film material that may be heated to enhance thermal emission with a low current input. Preferably the thin-film emitter is any emitter with low losses and a high conductivity and avoids temperature losses. The thin-film emitter minimizes energy dissipation through conduction, thus providing higher radiated power. The multi-pass optical cavity enhances the emissivity over a broadband. The combined effect provides broadband and directional enhancement of thermal radiation. FIG. 1 shows a scheme of the proposed system comprising a hot thin-film emitter and a back reflector optically aligned to form a cavity. The optical cavity is formed between such a semi-transparent emitter and a mirror or, for example, between two mirrors with the thin-film membrane interposed between the mirrors.

Figure 2:
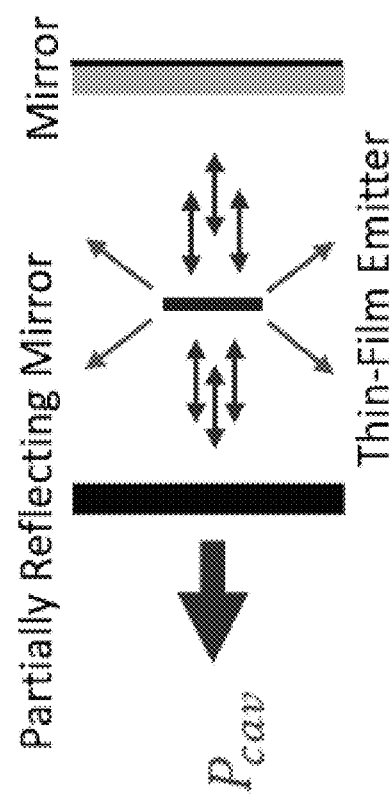
FIG. 2 illustrates a thin-film hot emitter placed inside an optical cavity formed by a pair of mirrors in another exemplary embodiment.

The matching of absorption to the transmission of the cavity allows optimum enhancement of thermal radiation. As an example, a level of enhanced power output of the broadband output beam is inversely proportionally to a difference between the transmissivity through the cavity and the absorption of the thin-film membrane. As a further example, the output power from the cavity is measured using a detector. The power from the bare-emitter (without cavity) is also measured separately and the enhancement is estimated by taking the ratio of two measured spectral powers. As an illustration, A>1 number of enhancement this case would mean that the power from cavity is more than the power from the bare-emitter (without cavity) at the same temperature. This matching can be done by, for example, choosing the thickness of the film and/or changing the loss in the cavity back mirror. A temperature in the cavity or of the thin-film membrane may configured such that transmissivity through the cavity substantially matches an absorption of the thin-film membrane. Other parameters of the cavity or of the thin-film membrane may configured such that transmissivity through the cavity substantially matches an absorption of the thin-film membrane. Choice of material and thickness of film (related to total loss of the film) and reflectivity of mirrors may be configured for matching. The transmission can also be optimized to match the absorption of the thin-film by adding another partially reflecting mirror in front of the film as shown in FIG. 2. As shown in FIG. 2, a thin-film hot emitter is placed inside an optical cavity formed by a pair of mirrors. The partially reflecting mirror can be appropriately chosen to match the transmission of the cavity with the absorption of the thin-film.

The thin-film membrane may comprise a dielectric or semiconductor, or both. As an example, a silicon carbide (SiC) thin-film emitter may be placed in front of a curved mirror. The SiC thin-film suspended emitter acts as one of the mirrors of the optical cavity while the back reflector is a concave mirror, together forming a configuration as shown in FIG. 1. The fabricated SiC thin-film emitter is found to be weekly absorbing (A~10%, adapted from the teachings of R. St-Gelais, et al., Near-field radiative heat transfer between parallel structures in the deep subwavelength regime, Nat. Nanotechnol. 11 (2016) 515-519). Through optimal design of cavity parameters, a 2.7× enhancement of thermal emission is found over the equivalent bare emitter (i.e., SiC emitter without mirrors).

Fabrication of SiC Membrane:

Silicon carbide thin-films are deposited on a standard silicon wafer using plasma enhanced chemical vapor deposition (PECVD) technique using a mixture of gases—silane and methane—in the ratio 1:20 as precursors with argon as a dilution gas, as taught by St-Gelais, et al. in the above-mentioned article. The deposited thin-films are then annealed at a high temperature of 600° C. for 90 min to obtain microcrystalline silicon carbide (µC—SiC) as described by St-Gelais, et al. µC—SiC handles high temperatures with slight (e.g. 10%) absorption. Those skilled in the art will appreciate that silicon nitride thin-films should have some absorption in the mid-infrared band on the order of 10-20% and could be used as well. Circular shaped membranes with concentrically placed integrated platinum heaters are suspended by etching of the silicon substrate from the back side using a combination of bosch ($SF_6$) and isotropic ($XeF_2$/N2=3:10, pulsed) etching techniques. A thin film of $SiO_2$ (t~40 nm) is deposited between silicon carbide and platinum heaters to avoid electrical short circuit. The integrated platinum heaters are also used to estimate the temperature of the membrane using their temperature coefficient of resistance ($\alpha_{Pt}$=0.0015 $K^{-1}$) as taught by St-Gelais, et al. Inset in FIG. 1a (inset) shows the microscope image of the suspended µC—SiC thin-film membrane (t~90 nm, R~400 µm) with integrated platinum heaters.

Experimental Results

Figure 3A:
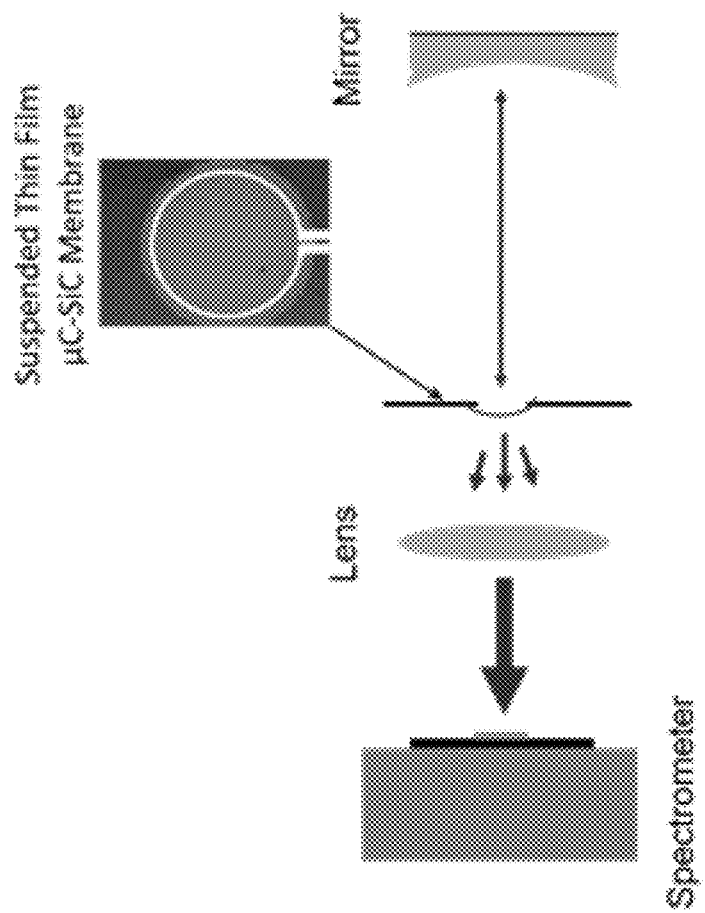
FIG. 3a illustrates a measurement setup used for recording spectral distribution of thermal emission.
Figure 3B:
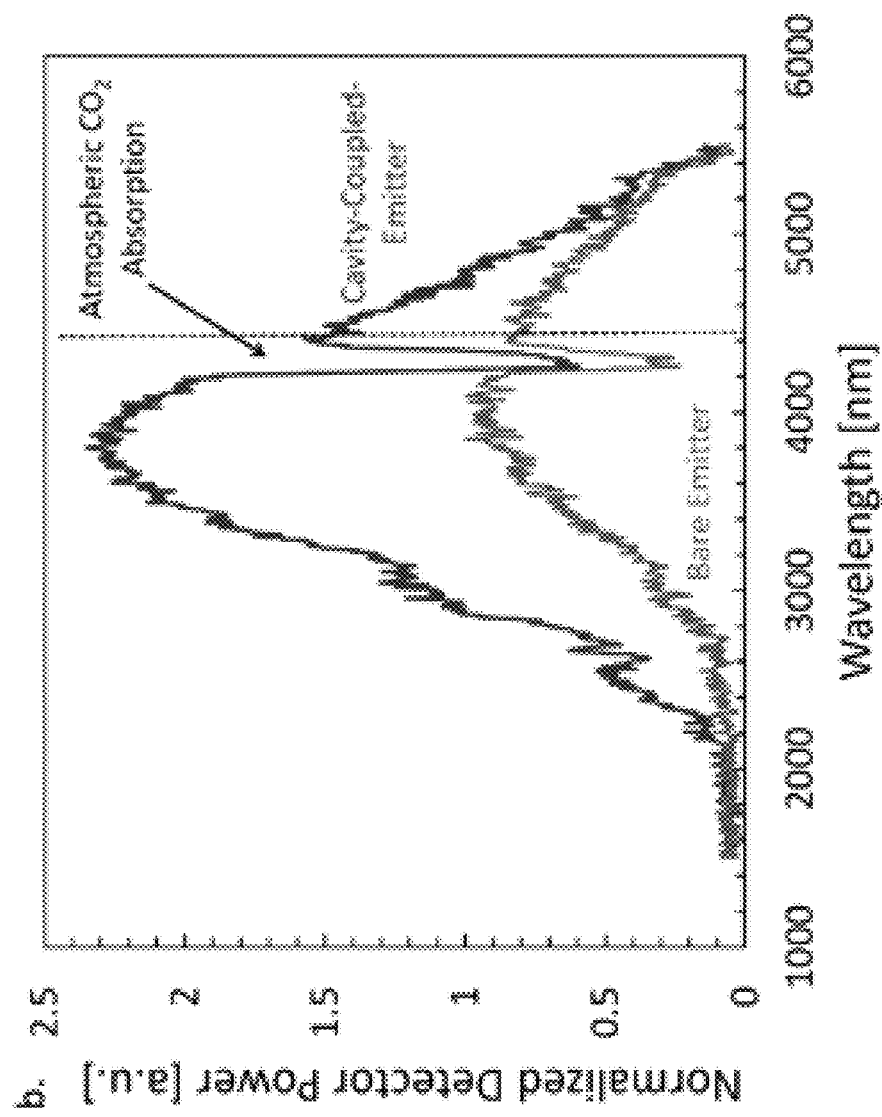
FIG. 3b illustrates a recorded thermal emission spectrum from a cavity-coupled-emitter and a bare emitter.

The configuration described in FIG. 1 was used to show enhanced thermal emission from a cavity-coupled-emitter system. The microcrystalline silicon carbide membrane and a broadband concave mirror ((Radius of Curvature: 100 mm) were optically aligned together to form a Fabry-Perot cavity. The membrane was then heated up to 590K by allying electrical power (Pin~79 mW) to the integrated heaters. The resulting thermal emission from the cavity-coupled-emitter configuration was collected using a convex lens (NA=0.5) and sent to a liquid $N_2$ cooled InSb detector through a monochromator to measure the spectral power distribution as shown in FIG. 3a. FIG. 3a illustrates a schematic of a measurement setup used for recording spectral distribution of thermal emission in an exemplary embodiment. As illustrated, the membrane and the back mirror form the Fabry-Perot cavity. The emitted thermal light is collected from using a lens and its spectral power distribution is measured. FIG. 3b illustrates recorded thermal emission spectrum from a cavity-coupled-emitter and a bare emitter. The measured spectral power data is normalized with respect to the bare emitter peak to show increased thermal emission. The vertical dotted line shows the detector cut-off. A total power enhancement of ~2.7× was observed while the maximum enhancement of >3× was seen for $\lambda$~2.4-3.1 µm.

Discussion

The approach described above shows enhancement of thermal light by optically coupling a hot emitter to an optical cavity. The phenomenon reported here follows Kirchhoff's law that states that the emissivity of any object equals its absorptivity for a given wavelength and direction. The back reflector allows recycling of emitted thermal radiation by absorbing a fraction of power in the thin-film. The hot emitter re-emits the absorbed radiation to remain in thermodynamic equilibrium leading to enhancement. Moreover, since the absorption of μC—SiC thin-film is wavelength dependent, the maximum emission occurs when the intrinsic cavity losses (absorption in thin film+back mirror losses) are critically matched to the transmission of the cavity. The absorption of the thin-film can be altered by varying the thickness of the film. The absorption of the film increases with the thickness until it saturates to become equal to that of the bulk material. For a certain thickness, the absorption by the film is optimum for achieving a sustained multi-pass optical cavity and a maximum possible enhancement can be obtained, as shown in FIG. 4. As the film absorption increases with thickness, the finesse and eventually enhancement of the cavity drops until the total emission reaches that of a bulk emitter. Thus, the source works optimally when the absorption of the material is matched to the coupling rate whereby the transmission out of the cavity is equal to the absorption within the cavity to provide no gain. This is accomplished by optimally matching the thickness of the thin-film to the desired absorption for the cavity. The calculations results for the total thermal emission form a μC—SiC emitter as a function of film thickness are shown in FIG. 4.

Figures 4A, 4B:
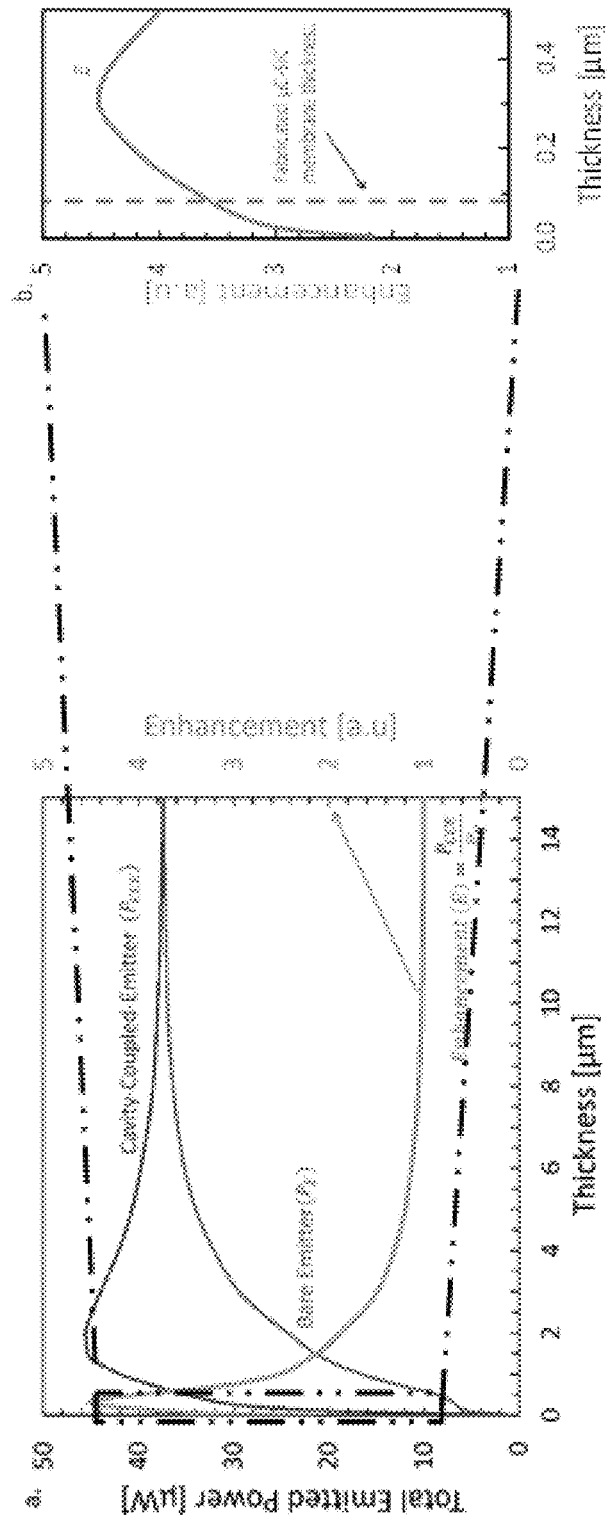
FIG. 4a illustrates the total power emission for bare ($P_E$) and cavity-coupled ($P_{CCE}$) µc-SiC emitter along with total power enhancement ($P_{CCE}/P_C$) as a function of film thickness.
FIG. 4b illustrates a section of FIG. 4a expanded to highlight the film thickness.

FIG. 4a illustrates the total power emission for bare ($P_E$) and cavity-coupled ($P_{CCE}$) μc-SiC emitter along with total power enhancement ($P_{CCE}/P_C$) as a function of film thickness. FIG. 4b illustrates a section of FIG. 4a expanded, highlighting film thickness used in the experiment. The maximum enhancement occurs at specific film thickness (200 nm) when the intrinsic losses of the cavity are critically matched with the transmission losses. The experimentally obtained total power enhancement (FIG. 1b) for the film thickness (t~90 nm) was 2.7× For the calculations presented here, the inventors have assumed a circular microcrystalline silicon carbide emitter of radius ~400 μm, solid angle ~0.92 rad and temperature 600 K. The calculations are done using a model based on 1D scatter matrix, as described by Cornelius, et al., Modification of Planck blackbody radiation by photonic band-gap structures, Phys. Rev. A. 59 (1999) 4736.

The method described herein shows the ability to enhance the thermal emission from a hot emitter as well as control its emission peak by simply changing the coupling parameters of the cavity. The procedure does not require any special material changes or modification of its surface properties to increase the thermal emission. Cavity-coupled thin-film thermal emitters can emit higher thermal light more efficiently compared to that for their bulk emitters through optimum design of film-thickness. Such enhancement of thermal radiation can also be obtained using different cavity designs. This technique can be leveraged to develop efficient thermal emitters using a wide class of materials.

What is claimed:

1. An emitter comprising a thin-film membrane disposed within a cavity so as to provide an output beam, wherein the cavity is configured such that transmissivity through the cavity substantially matches an absorption of the thin-film membrane.

2. The emitter of claim 1, wherein a thickness of the thin-film membrane is selected whereby the absorption of the thin-film membrane matches the transmissivity of the cavity.

3. The emitter of claim 1, further comprising a cavity back mirror, wherein a loss of the cavity back mirror matches the transmissivity of the cavity.

4. The emitter of claim 3, further comprising a partially reflecting mirror in front of the thin-film membrane, wherein the thin-film membrane is disposed in the cavity between the cavity back mirror and the partially reflecting mirror.

5. The emitter of claim 4, wherein the partially reflecting mirror is selected whereby the transmissivity through the cavity matches an absorption of the thin-film membrane.

6. The emitter of claim 3, wherein the cavity back mirror comprises a broadband mirror.

7. The emitter of claim 6, wherein the thin-film membrane and the broadband mirror are optically aligned to form a Fabry-Perot cavity.

8. The emitter of claim 1, wherein the thin-film membrane comprises a dielectric or semiconductor material, or a combination of both.

9. An emitter comprising a thin-film membrane disposed within a cavity so as to provide a broadband output beam, wherein one or more of a transmissivity through the cavity and an absorption of the thin-film membrane is configured to provide enhanced power output of the broadband output beam.

10. The emitter of claim 9, wherein the cavity is configured such that transmissivity through the cavity substantially matches the absorption of the thin-film membrane.

11. The emitter of claim 9, wherein a thickness of the thin-film membrane is selected whereby the absorption of the thin-film matches the transmissivity of the cavity.

12. The emitter of claim 9, further comprising a cavity back mirror, wherein a loss of the cavity back mirror matches the transmissivity of the cavity.

13. The emitter of claim 12, further comprising a partially reflecting mirror in front of the thin-film membrane, wherein the thin-film membrane is disposed in the cavity between the cavity back mirror and the partially reflecting mirror.

14. The emitter of claim 13, wherein the partially reflecting mirror is selected whereby the transmissivity through the cavity matches the absorption of the thin-film membrane.

15. The emitter of claim 12, wherein the cavity back mirror comprises a broadband mirror.

16. The emitter of claim 15, wherein the thin-film membrane and the broadband mirror are optically aligned to form a Fabry-Perot cavity.

17. The emitter of claim 9, wherein the thin-film membrane comprises a dielectric or semiconductor material, or a combination of both.

18. The emitter of claim 9, wherein a temperature in the cavity or of the thin-film membrane is configured such that transmissivity through the cavity substantially matches the absorption of the thin-film membrane.

19. The emitter of claim 9, wherein a level of enhanced power output of the broadband output beam is inversely proportionally to a difference between the transmissivity through the cavity and the absorption of the thin-film membrane.

20. A method of using the emitter of claim 9.

* * * * *